(12) United States Patent
Satou et al.

(10) Patent No.: US 12,447,616 B2
(45) Date of Patent: Oct. 21, 2025

(54) PROGRAM GENERATION DEVICE AND PROGRAM GENERATION METHOD GENERATING A ROUTE PROGRAM FOR THAT RETURNS TIP OF ROBOT FROM END POINT BY A PRESCRIBED DISTANCE

(71) Applicant: FANUC CORPORATION, Yamanashi (JP)

(72) Inventors: Takashi Satou, Yamanashi (JP); Yihua Gu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 437 days.

(21) Appl. No.: 17/998,146

(22) PCT Filed: May 6, 2021

(86) PCT No.: PCT/JP2021/017390
§ 371 (c)(1),
(2) Date: Nov. 7, 2022

(87) PCT Pub. No.: WO2021/230135
PCT Pub. Date: Nov. 18, 2021

(65) Prior Publication Data
US 2023/0211500 A1    Jul. 6, 2023

(30) Foreign Application Priority Data
May 11, 2020    (JP) .................................. 2020-082952

(51) Int. Cl.
*G05B 19/23*      (2006.01)
*B25J 9/16*       (2006.01)
(Continued)

(52) U.S. Cl.
CPC .......... *B25J 9/1664* (2013.01); *B25J 9/1633* (2013.01); *B25J 9/1694* (2013.01); *B25J 11/005* (2013.01);
(Continued)

(58) Field of Classification Search
CPC .................................................... G05B 19/231
See application file for complete search history.

(56) References Cited

U.S. PATENT DOCUMENTS

2002/0173878 A1* 11/2002 Watanabe .............. B25J 9/1638
                                                                 700/247
2004/0193293 A1*  9/2004 Watanabe .............. B25J 9/1638
                                                                 700/56
(Continued)

FOREIGN PATENT DOCUMENTS

| CN | 1792573 A   | 6/2006 |
|----|-------------|--------|
| CN | 104349873 A | 2/2015 |

(Continued)

OTHER PUBLICATIONS

International Search Report issued in PCT/JP2021/017390; mailed Jul. 13, 2021.

*Primary Examiner* — Suresh Suryawanshi
(74) *Attorney, Agent, or Firm* — Studebaker Brackett PLLC

(57) ABSTRACT

Provided is a program generation device capable of automatically generating a route program which takes into account the amount of bending when the tip of a robot abuts against a workpiece. This program generation device is provided with: an acquisition unit that acquires route data indicating a route to be followed by the tip of the robot with respect to an object; a detection unit that detects a pressing force for pressing the tip of the robot to the object; a calculation unit that calculates the amount of misalignment of the followed route caused by bending of the tip of the (Continued)

robot, on the basis of the pressing force detected by the detection unit and a prescribed constant; and a generation unit that automatically generates a route program for controlling a moving route of the tip of the robot, on the basis of the route data acquired by the acquisition unit and the amount of misalignment calculated by the calculation unit.

5 Claims, 11 Drawing Sheets

(51) Int. Cl.
    *B25J 11/00*     (2006.01)
    *G05B 19/404*     (2006.01)

(52) U.S. Cl.
    CPC .. *G05B 19/404* (2013.01); *G05B 2219/36349* (2013.01); *G05B 2219/39176* (2013.01)

(56) References Cited

U.S. PATENT DOCUMENTS

| | | | |
|---|---|---|---|
| 2004/0193320 A1* | 9/2004 | Watanabe | B25J 9/1664 700/245 |
| 2008/0027580 A1 | 1/2008 | Zhang et al. | |
| 2008/0297092 A1 | 12/2008 | Nihei et al. | |
| 2010/0305753 A1 | 12/2010 | Weiss et al. | |
| 2011/0118876 A1 | 5/2011 | Hayama et al. | |
| 2015/0005923 A1 | 1/2015 | Gu | |
| 2017/0017226 A1* | 1/2017 | Yamazaki | B23Q 17/2471 |
| 2018/0014887 A1 | 1/2018 | Ferreira et al. | |
| 2018/0164773 A1* | 6/2018 | Wang | B25J 13/06 |
| 2018/0171447 A1 | 6/2018 | Hawkes et al. | |
| 2019/0193167 A1 | 6/2019 | Horiuchi et al. | |

FOREIGN PATENT DOCUMENTS

| | | | | |
|---|---|---|---|---|
| CN | 106457560 A | | 2/2017 | |
| CN | 108340370 A | | 7/2018 | |
| CN | 112454354 A | * | 3/2021 | ............ B25J 11/005 |
| JP | S61-086194 A | | 5/1986 | |
| JP | H05-329787 A | | 12/1993 | |
| JP | H08-039465 A | | 2/1996 | |
| JP | 2003-191186 A | | 7/2003 | |
| JP | 2004-299010 A | | 10/2004 | |
| JP | 2012-139789 A | | 7/2012 | |
| JP | 2012-196753 A | | 10/2012 | |
| JP | 2015-009324 A | | 1/2015 | |
| JP | 2017-140684 A | | 8/2017 | |
| JP | 2018-094638 A | | 6/2018 | |
| JP | 2018118340 A | * | 8/2018 | ............ B25J 13/08 |
| WO | WO-2011036865 A1 | * | 3/2011 | ............ B25J 13/08 |
| WO | 2018/010373 A1 | | 1/2018 | |
| WO | WO-2018123251 A1 | * | 7/2018 | ............ B25J 11/005 |

* cited by examiner

US 12,447,616 B2

PROGRAM GENERATION DEVICE AND PROGRAM GENERATION METHOD GENERATING A ROUTE PROGRAM FOR THAT RETURNS TIP OF ROBOT FROM END POINT BY A PRESCRIBED DISTANCE

TECHNICAL FIELD

The present invention relates to a program generation device and a program generation method.

BACKGROUND ART

Conventionally, in a program generation device, there is known a method that detects an actual ridge of deburring by a visual sensor in a machining deburring step performed by a robot, and creates a route program corresponding to the ridge (Japanese Unexamined Patent Application, Publication No. 2015-009324). Furthermore, there is known a method that detects a path of an end effector by a visual sensor also in a polishing step, and creates a route program corresponding to the path.

In the machining deburring step and the polishing step, the robot alarm-stops when it reaches or passes near a singular point, a limit of each axis, a set prohibited zone, or the like. To avoid this, normally, a motion path is taught/set so as not to pass near the singular point, the limit, and the set prohibited zone.

Furthermore, when automatically creating a route program according to the actual ridge or path, even if there is no problem with a certain workpiece, the singular point or the limit may become an alarm in another workpiece due to a difference in a fixed position or a difference in the size or shape of the workpiece itself.

Patent Document 1: Japanese Unexamined Patent Application, Publication No. 2015-009324

DISCLOSURE OF THE INVENTION

Problems to be Solved by the Invention

In a system that uses the route program described above, in prescribed workpiece machining such as a deburring step, for example, a force of the robot for pressing a tool against the workpiece is generated. Thus, in a state where an arm of the robot is deflected, a tip of the robot (end effector/machining tool) comes at a position slightly biting into the workpiece.

However, such an amount of deflection is not taken into consideration in the route program that controls a moving route of the tip part of the robot, so that there is misalignment generated in the actual position when a deburring robot is pressing the tool against the workpiece. It is therefore pointed out that whether it has reached the singular point, limit of each axis, the set prohibited zone, or the like may not be determined properly and that the workpiece itself or the end effector (tip of the arm of the robot)/machining tool may be damaged. In such a route program, it is desirable for the amount of deflection of the tip part of the robot to be taken into consideration when the tip of the robot abuts against the workpiece.

Means for Solving the Problems

A program generation device according to the present disclosure includes: an acquisition unit that acquires route data indicating a route to be followed by a tip of a robot with respect to a target; a detection unit that detects a pressing force for pressing the tip of the robot against the target; a calculation unit that calculates an amount of misalignment of the route to be followed caused due to deflection of the tip of the robot, based on the pressing force detected by the detection unit and a prescribed constant; and a generation unit that automatically generates a route program for controlling a moving route of the tip of the robot based on the route data acquired by the acquisition unit and the amount of misalignment calculated by the calculation unit.

Effects of the Invention

According to one aspect, it is possible to automatically generate the route program that takes the amount of deflection into consideration when the tip part of the robot abuts against the workpiece.

PREFERRED MODE FOR CARRYING OUT THE INVENTION

Hereinafter, embodiments of the present disclosure will be described.

First Embodiment

Figure 1:
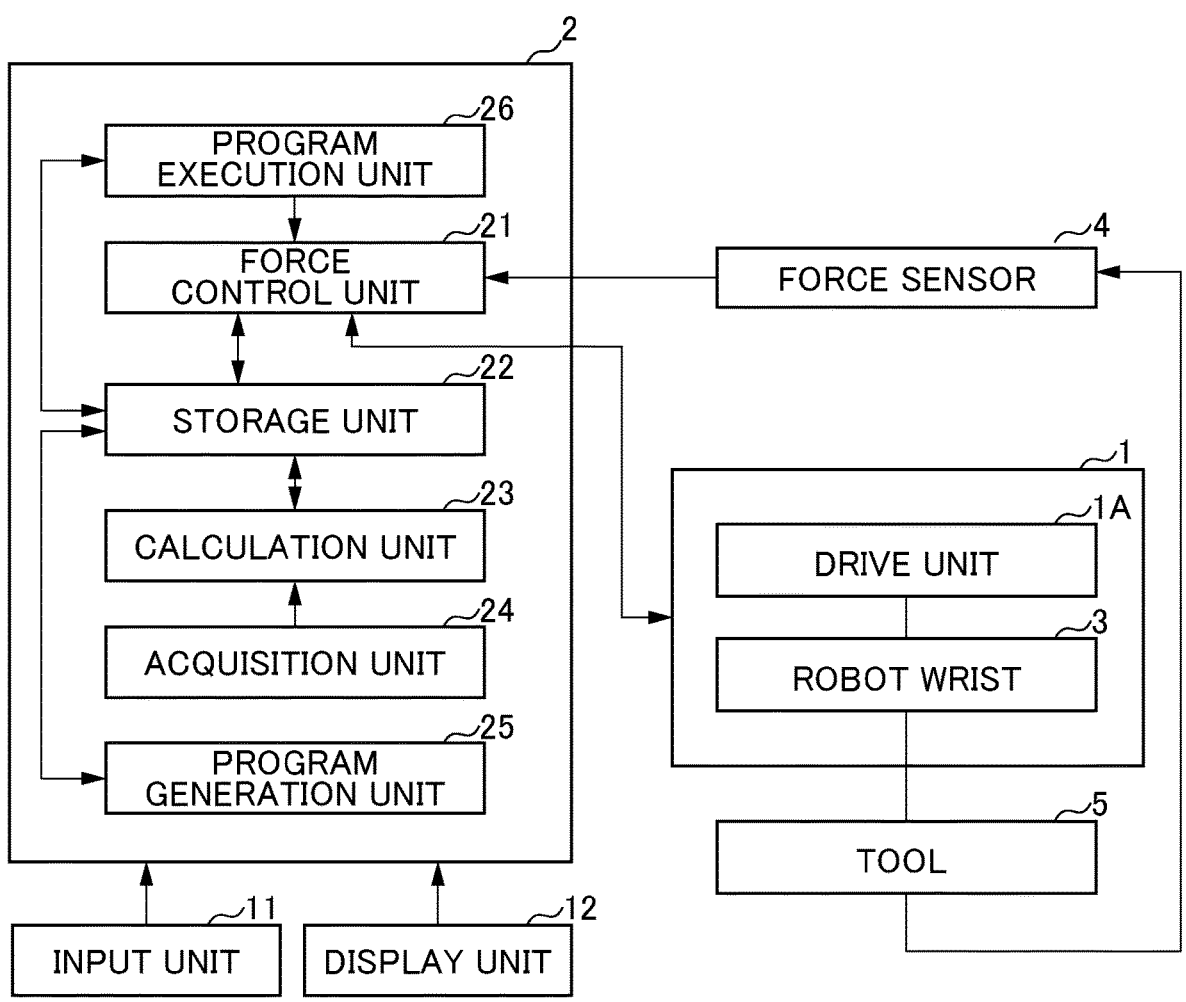
FIG. 1 is a block diagram for describing a constitution of a robot device illustrating the present embodiment.

FIG. 1 is a block diagram for describing a constitution of a robot device illustrating a first embodiment. Hereinafter, a program generation device and a programming method for generating a route program applied to a robot device 1 will be described in detail. This example illustrates a case where a prescribed tool is a deburring tool, for example.

The robot device discussed in the present embodiment includes the robot device 1, a controller 2 of the robot device 1, a robot wrist (end effector) 3, a force sensor 4, and a deburring tool 5. The deburring tool 5 performs machining on a workpiece 7 illustrated in FIG. 6 and the like to be described later. As for the workpieces 7, there are positioning errors, and there are also variations in the shapes and sizes thereof. Furthermore, the controller 2 is configured with a force control unit 21, a storage unit 22, a calculation unit 23, an acquisition unit 24, a program generation unit 25, and a program execution unit 26.

Note that the controller 2 includes an input unit 11 and a display unit 12 via an interface, not shown. The robot device 1 includes a drive unit 1A, and machining processing of the deburring tool 5 is executed according to an instruction from the force control unit 21. The input unit 11 inputs the amount of deflection of the robot wrist (end effector) 3 measured by an operator.

The storage unit 22 stores, in an updatable manner, a deburring program and a polishing program generated by the program generation unit 25 as well as parameters (shape, size, material) of each workpiece required for each of such machining programs.

The acquisition unit 24 communicates with a prescribed CAD system, not shown, to acquire route data of the end effector 3 that moves when performing machining on a target (workpiece W), and stores it in the storage unit 22. The calculation unit 23 calculates the amount of deflection for the pressing force detected by the force sensor 4 using a spring constant that is stored in a manner as described later. The program generation unit 25 generates a route program that is acquired by compensating the machining route data stored in the storage unit 22 based on the calculated amount of deflection. The program execution unit 26 executes the compensated route program to control the force control unit 21 and the drive unit 1A so as to control the moving route of the tip part of the robot device 1 to which a prescribed tool is attached.

In the case of the robot device illustrated in FIG. 1, the calculation unit 23 calculates the amount of deflection based on the spring constant k stored in the storage unit 22 in a manner described later and the pressing amount detected by the force sensor 4. Then, the program generation unit 25 generates a route program by taking the amount of deflection into consideration based on the route data (CAD data) stored in the storage unit 22 and the calculated amount of deflection.

Note that the CAD data acquired by the acquisition unit 24 may be created by processing shape data or image data for machining the workpiece W and tracing the route for pressing the tool by using a trace command or the like, for example, or may be automatically created by raster/vector conversion processing. In the present embodiment, the ridge of the target (workpiece W) is taken as the route data along which the end effector as the tip part of the robot device 1 follows, or the straight route moving linearly on the plane of the target is taken as the CAD data.

This makes it possible to generate the route program adapted for the amount of deflection of both cases, whether the prescribed tool attached to the end effector 3 is a deburring tool or a polishing tool.

The program generation unit 25 as a generation unit automatically generates and stores, in the storage unit 22, the route program that controls the path along which the end effector 3 of the robot device 1 moves, based on the route data which is stored in the storage unit 22 and along which the end effector 3 of the robot device 1 follows.

The force sensor 4 as a detection unit detects the pressing force that presses the prescribed tool attached to the end effector of the robot device 1 to be described later against the workpiece W, and outputs it to the force control unit 21 and the calculation unit 23. In a case where the data of the force sensor 4 is an analog amount, the amount of deflection is output as digital data via an A/D converter, not shown.

The calculation unit 23 calculates, based on the pressing force detected by the force sensor 4 and the prescribed constant (spring constant), an amount of misalignment of the route to be followed caused due to deflection of the arm of the robot device 1, and stores the calculation result in the storage unit 22. Note that details of calculation of the amount of misalignment will be described later.

The program generation unit 25 reads the amount of deflection of each workpiece stored in the storage unit 22, and generates and stores, in the storage unit 22, a route program acquired by compensating the machining route data based on a deburring step stored in the storage unit 22 in advance.

The force control unit 21 outputs drive control information for performing the deburring three-dimensionally to the drive unit 1A of the robot device 1 according to the compensated route program stored in the storage unit 22. The drive unit 1A of the robot device 1 performs three-dimensional movement of the robot arm and drive of a prescribed tool such as the deburring tool 5, for example, based on the drive control information output from the force control unit 21 and machining control information of the visual sensor 8, the force sensor 4, and the like.

First Spring Constant Calculation Example

Hereinafter, spring constant calculation processing performed by the calculation unit 23 illustrated in FIG. 1 will be described in detail. The calculation unit 23 measures the amount of deflection for the pressing force in X, Y, and Z directions in typical positions and poses of the robot device 1 (for example, all "0" in J1 to J6). Note here that the pressing force is acquired from the output of the force sensor 4. Assuming that the pressing force F and the amount of deflection L are in a proportional relation, the calculation unit 23 calculates the spring constant ($k=F/L$) according to $L=F/k$ (spring constant).

In this example, the value of the spring constant k corresponding to a prescribed tool is calculated from the pressing force F sensed by the force sensor 4 and the measured amount of deflection L. When assumed not to be in a proportional relation, a function F is acquired. The program generation unit 25 uses the spring constant k or the function F for all positions and poses.

Furthermore, the calculation unit 23 stores the calculated spring constant k corresponding to the prescribed tool in the storage unit 22 as a spring constant table according to information for identifying the robot device 1 and each tool.

Second Spring Constant Calculation Example

Figure 2:
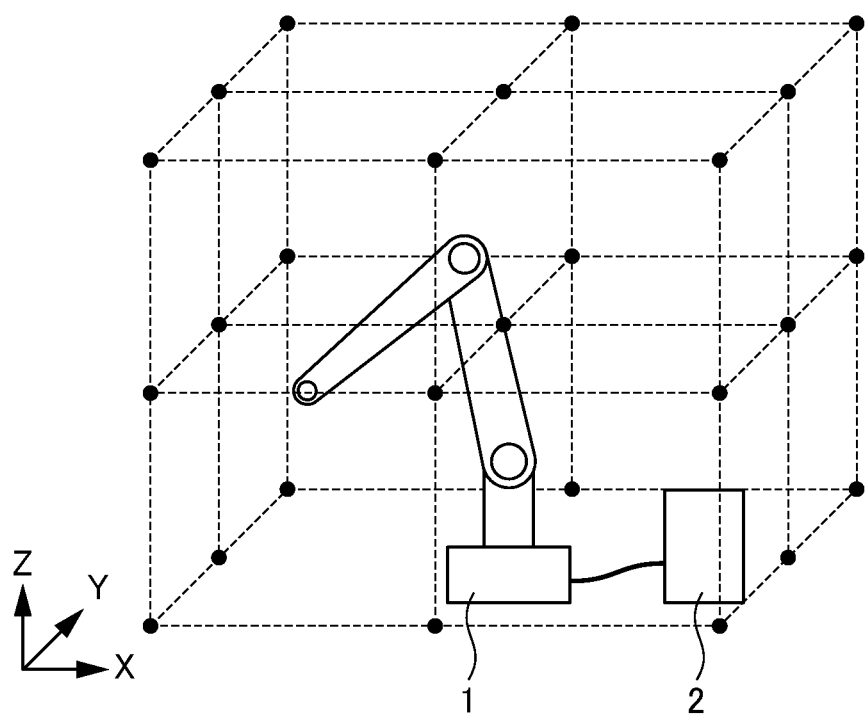
FIG. 2 is a diagram illustrating positional coordinates of sampling points for measuring the amount of deflection by a calculation unit illustrated in FIG. 1.

FIG. 2 is a diagram illustrating positional coordinates of sampling points for measuring the amount of deflection by the calculation unit 23 illustrated in FIG. 1. Black circles in the diagram represent the sample points at which the amount of deflection is measured.

In the example illustrated in FIG. 2, the calculation unit 23 sets many points within a motion range of the robot device 1, such as many grating points at equivalent intervals in the XYZ-axis directions, for example. The operator conducts actually measures of the amount of deflection for the pressing force in the XYZ directions in the position/pose of the robot device 1 at each sampling point. The calculation unit 23 calculates the spring constant kxyz or the function fxyz corresponding to the prescribed tool at the sampling point by calculation same as the first deflection amount calculation example, and stores the calculation result in the storage unit 22.

Note that it may also be calculated by simulation without actually measuring the amount of deflection like the calculation example described above. The amount of deflection normally varies for each model of the robots, so that simulation is performed for each of the models of the robots to be used. Specifically, a physical model considering the characteristics such as the link length of the robot, mass/inertia of each part, and the reducer of each axis is created, and the amount of deflection for the pressing force applied to the tip of the robot or the end effector is calculated by simulation. It is assumed here that the spring constant is actually measured.

Figure 3:
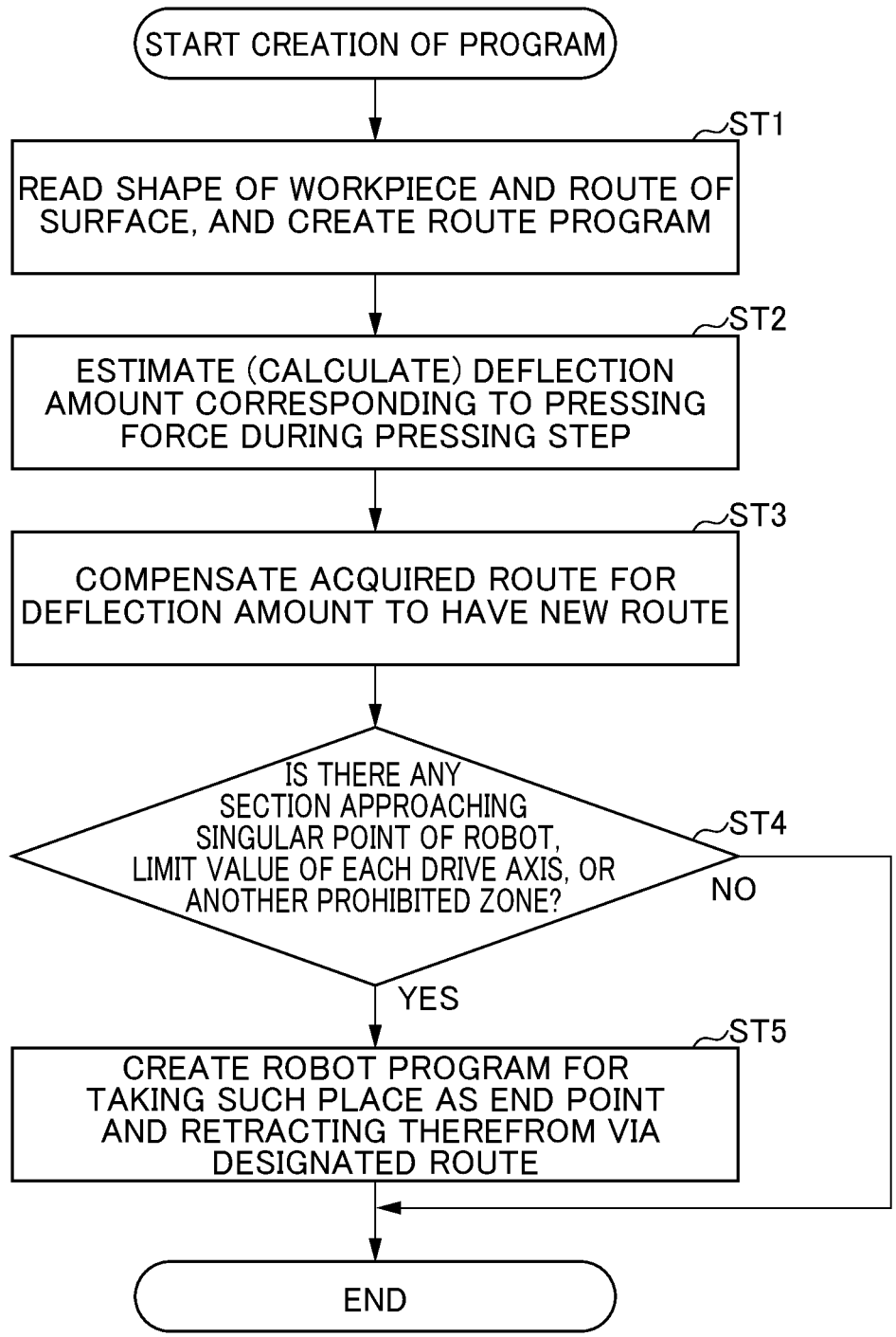
FIG. 3 is a flowchart for describing a control procedure of a program generation device illustrating the present embodiment.

FIG. 3 is a flowchart for describing a control procedure of the program generation device illustrating the present embodiment. Note that ST1 to ST5 indicate each of steps, and each of the steps is implemented when a CPU, not shown, loads and executes a control program stored in a ROM or the like on a RAM. This example corresponds to program generation processing in machining while pressing the tool against the workpiece.

First, after reading the route data corresponding to a prescribed tool, such as the route data following a ridge route or the route data following a straight route, for example, from the storage unit 22, the program generation unit 25 creates a route program according to the route data, and temporarily holds it in the storage unit 22 (ST1). Note here that the route data is created in advance by a CAD system, not shown, and it is assumed to be acquired by the acquisition unit 24 and stored in the storage unit 22. Furthermore, the route data is data in which the amount of deflection in the tip part is not taken into consideration.

Then, the calculation unit 23 refers to a spring constant table for a prescribed tool stored in the storage unit 22 based on the identification information of the robot device 1 as well as the size, material, and the like of the workpiece W, and calculates the amount of deflection caused when the prescribed tool is pressed against the workpiece W by performing calculation processing using the read spring constant k corresponding to the prescribed tool and the pressing force of the prescribed tool detected by the force sensor 4 (ST2).

Based on the calculated amount of deflection, the program generation unit 25 creates a new route program that is acquired by compensating the route data of the route program for the prescribed tool stored in the storage unit 22 in advance (ST3).

Then, the program generation unit 25 analyzes the newly created route program to determine whether there is any section approaching the singular point of the robot device 1, limit value of each drive axis, or another prohibited zone (ST4). When the program generation unit 25 determines herein that there is a section approaching the singular point of the robot device 1, limit value of each drive axis, or another prohibited zone, the processing is advanced to ST5.

Then, the program generation unit 25 creates a route program that takes the place specified in Step ST4 as the end point and retracts therefrom via a designated route (ST5), and ends the processing. Note that the created final route program is stored in the storage unit 22.

In the meantime, when the program generation unit 25 determines in Step ST4 that there is no section approaching the singular point of the robot device 1, limit value of each drive axis, or another prohibited zone, the processing is ended.

Figure 4:
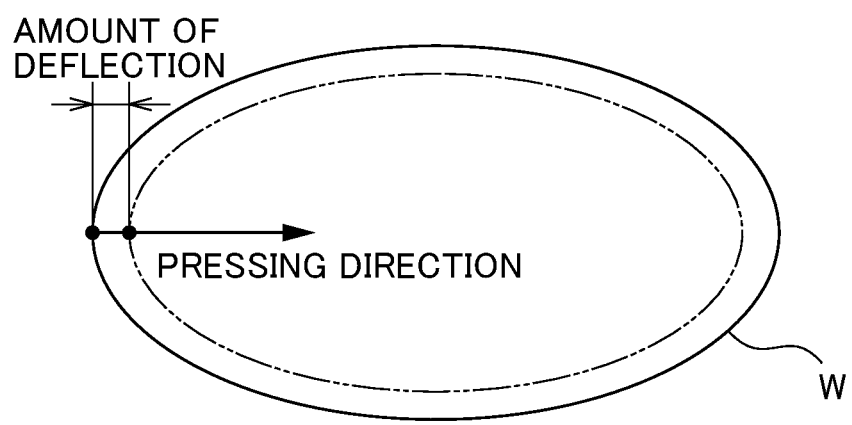
FIG. 4 is a schematic plan view illustrating a ridge route based on a route program generated by a program generation unit illustrated in FIG. 1.

FIG. 4 is a schematic plan view illustrating a ridge route based on the route program generated by the program generation unit 25 illustrated in FIG. 1. As for the black circle points in the drawing, the outer side is the point on a path not taking deflection into consideration, while the inner side is the point on a path taking deflection into consideration. The broken line indicates a path formed by connecting the tip positions considering deflection of the deburring tool 5.

Thereby, the amount of deflection caused when the deburring tool 5 attached to the robot device 1 abuts against the workpiece W is taken into consideration, so that it is possible to perform deburring of the workpiece W with high accuracy without having misalignment.

Effect of First Embodiment

According to the present embodiment, it is possible to automatically generate the route program that is compensated according to the amount of deflection caused due to deflection of the arm of the robot when the prescribed tool attached to the robot is actually pressed against the workpiece.

Second Embodiment

The embodiment above is described by referring to a case of generating the route program by compensating, according to the amount of deflection of the arm of the robot device 1, the route data for the prescribed tool pressed against the workpiece, which is acquired and stored by the acquisition unit 24 from the CAD system. Hereinafter, an embodiment for generating a route program based on the route data of the tool acquired by using a visual sensor 8 and the amount of deflection of the arm of the robot device 1 acquired by calculation will be described in detail. Hereinafter, described is an example where the route along which the deburring tool 5 moves in a deburring step is a route that moves along the ridge on the workpiece W.

Route Program Generation Processing for Deburring Step as Example

Figure 5:
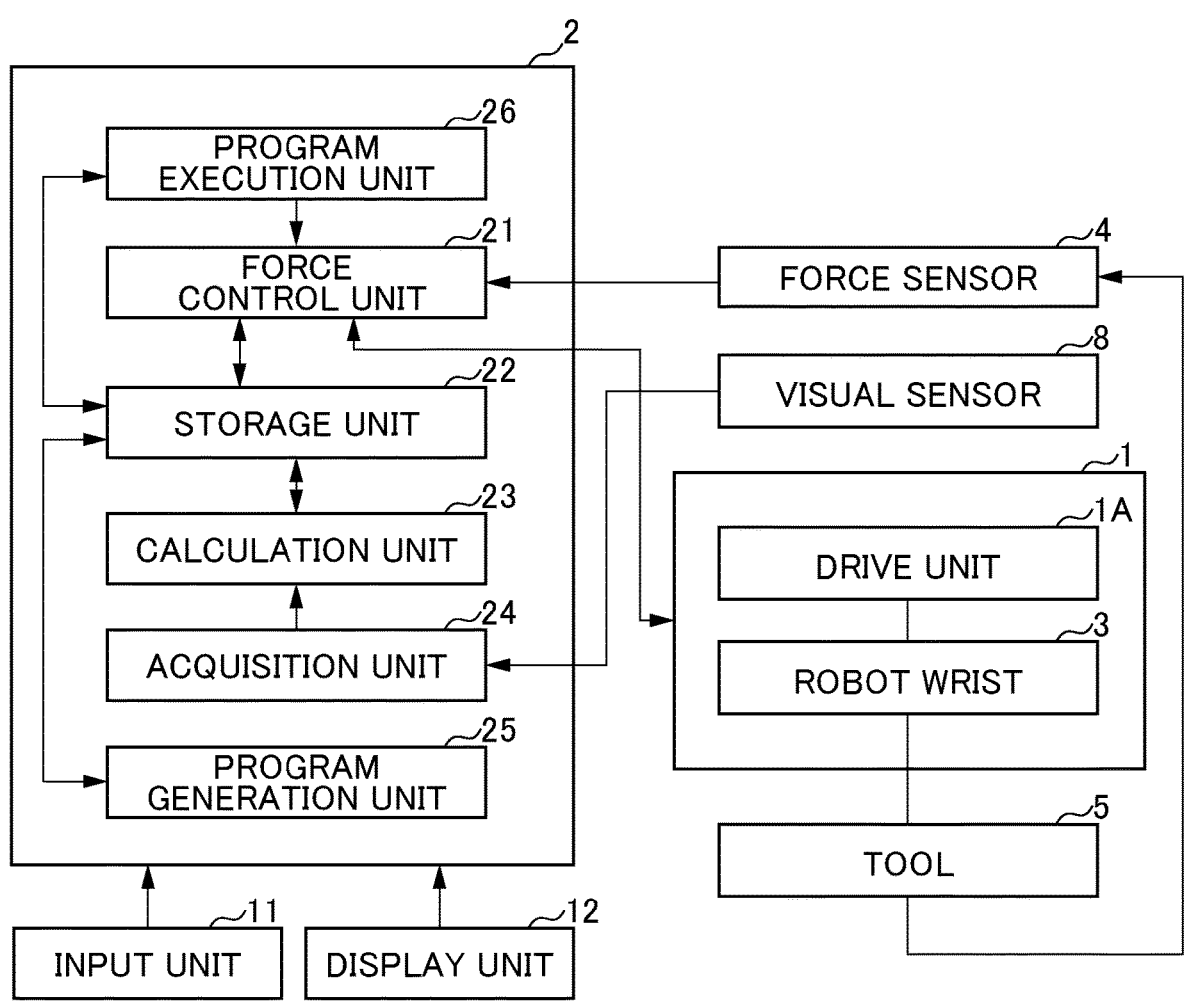
FIG. 5 is a block diagram for describing a constitution of the program generation device illustrating the present embodiment.

FIG. 5 is a block diagram for describing a constitution of the program generation device illustrating the present embodiment. Note that same reference numerals are applied to the same components as those of FIG. 1, and duplicated explanations thereof are avoided. The visual sensor 8 is provided above the workpiece W to be movable three-dimensionally, and detects a deburring ridge of the target (workpiece W) by capturing an image of a ridge route along which the end effector as the tip part of the robot device 1 follows.

In the present embodiment, the calculation unit 23 calculates in advance the amount of deflection based on the pressing force against the workpiece detected by the force sensor 4 and the stored spring constant for the deburring tool 5. The program generation unit 25 creates and stores, in the storage unit 22, a route program based on the route data that is acquired by actually capturing an image of a prescribed step such as the deburring step, for example, by the visual sensor 8. Thereafter, the program generation unit 25 creates a new route program based on the route program stored in the storage unit 22 and the amount of deflection.

When analyzing the deburring ridge data detected by the visual sensor 8 and automatically creating the route program based on the ridge data, the program generation unit 25 creates the route program that takes the place when approaching the singular point, limit value of each axis, or another set prohibited zone as the end point, and retracts therefrom via a designated route thereafter.

Similarly, the program generation unit 25 creates a route program with which the tool follows the retracting path once, and again returns to the path detected by the visual sensor 8 after moving away from the singular point, limit value of each axis, or other set prohibited zones by a prescribed distance. Furthermore, during deburring, a pressing force is generated by the robot device 1, so that the arm of the robot device 1 is deflected.

Thus, in the present embodiment, it is desirable to determine the singular point and limit at the position where the amount of deflection is compensated. Hereinafter, the amount of deflection of the robot in the position/pose is acquired in advance or calculated by the function described above. Hereinafter, a deburring step performed by the robot device 1 to which the present embodiment is applied will be described by referring to the drawings.

Figure 6:
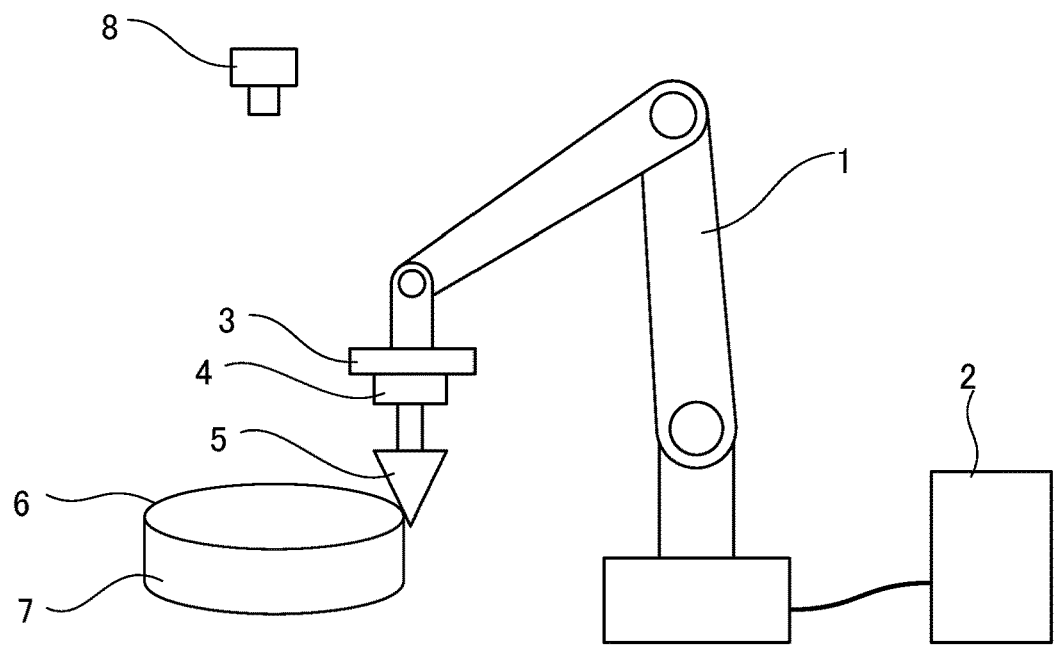
FIG. 6 is a schematic view for describing a deburring step performed by a robot illustrating the present embodiment.
Figure 7:
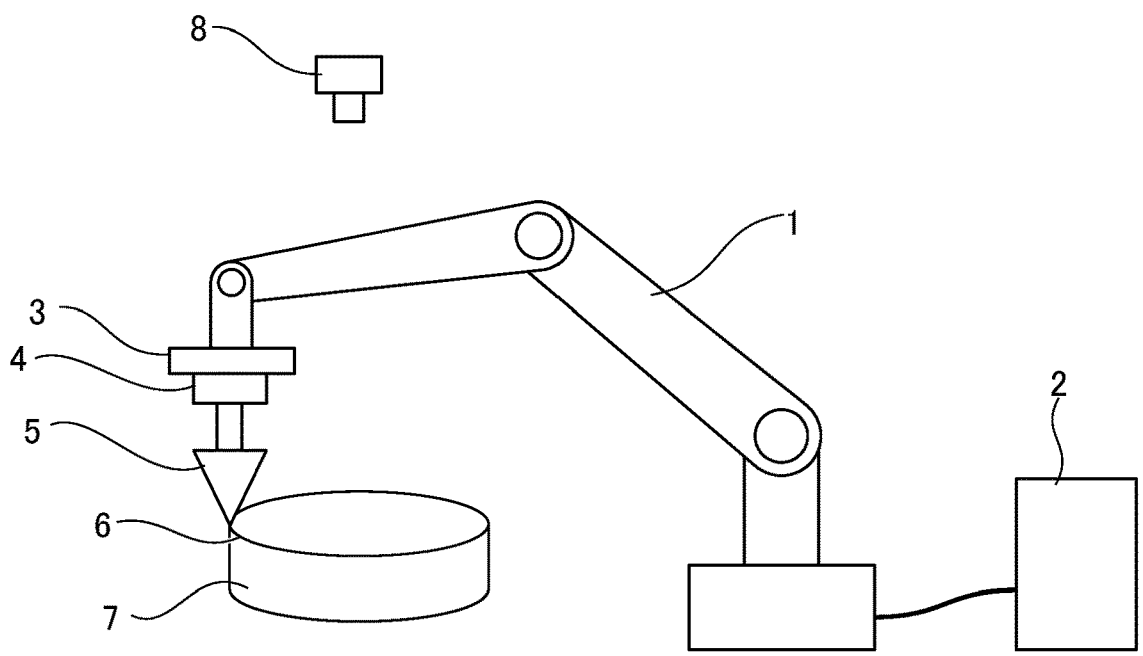
FIG. 7 is a schematic view for describing the deburring step performed by a robot illustrating the present embodiment.
Figure 8:
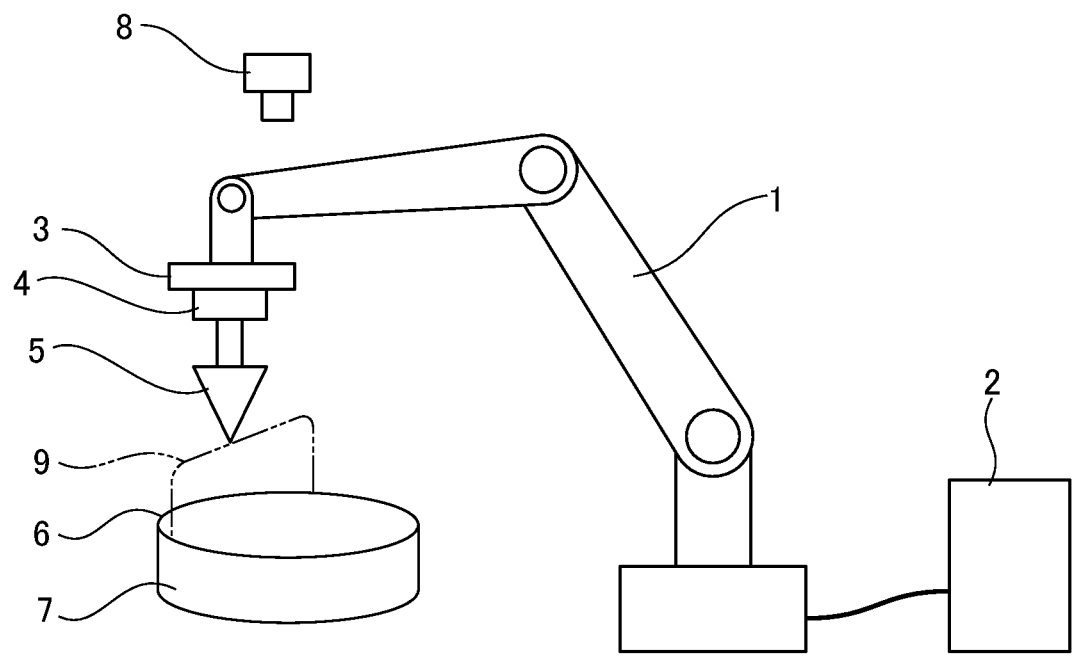
FIG. 8 is a schematic view for describing the deburring step performed by a robot illustrating the present embodiment.

FIG. 6 to FIG. 8 are schematic views for describing the deburring step performed by the robot illustrating the present embodiment, in which FIG. 6 illustrates a state where the deburring tool approaches the start point of the deburring path, FIG. 7 illustrates a state where the automatically generated path passes near the singular point, and FIG. 8 illustrates the path (broken line) for retracting to move away from the singular point. As for the robot device 1 of this example, machining steps and program generation processing are controlled comprehensively by the controller 2 that is connected via a prescribed interface.

A deburring device includes the robot device 1, the controller 2 of the robot device 1, the robot wrist (end effector) 3, the force sensor 4, the deburring tool 5, the workpiece 7, and the visual sensor 8. As for the workpieces 7, there are positioning errors, and also variations in the shapes and sizes thereof. Note that a deburring part 6 corresponds to a part (ridge) that is machined by the deburring tool 5 using the workpiece 7.

The robot device 1 is configured with an articulated robot including a plurality of arms. The force sensor 4 is provided at the robot wrist 3 located at the tip of the arm of the robot device 1, and the deburring tool 5 is attached to the force sensor 4. The robot device 1 can take various positions and poses by rotating electric motors (servo motors) provided at each of joints according to control signals output from the controller 2. The robot device 1 is not limited to those illustrated in the drawings but any robots having already known forms can be applied.

The deburring tool 5 is a tool used in general for removing burrs of the workpiece W, and is not limited to any specific form. Examples of the tool include a cutter, a grinder, and the like. The deburring tool 5 is fixed to the robot wrist 3 of the robot device 1, and moves together with the robot wrist 3 in accordance with the motion of the robot device 1.

Note that the controller 2 includes the input unit 11 and the display unit 12 via an interface, not shown. The robot device 1 includes the drive unit 1A and, when a machining start instruction is received from the input unit 11, machining processing of the deburring tool 5 is executed according to an instruction from the force control unit 21.

The storage unit 22 stores, in an updatable manner, a route program for deburring and a route program for polishing generated by the program generation unit 25 as well as parameters (shape, size, material) of each workpiece required for each of such machining programs.

Note that the program generation unit 25 analyzes the deburring ridge data (route data) that is captured and detected by the visual sensor 8, and automatically creates a route program with which the robot wrist (end effector) 3 follows the ridge data. At this time, the program generation unit 25 creates the route program that takes the coordinate value thereof as the end point when the end effector 3 approaches the singular point, limit value of each axis, or another set prohibited zone, and retracts the end effector 3 via a designated route thereafter.

That is, the program generation unit 25 creates the route program that takes the coordinate value when the route acquired by compensating the route the end effector follows with the calculated amount of misalignment approaches the singular point of the robot device 1, limit value of each axis, or set prohibited zone as the end point, and retracts the end effector 3 from the end point via the designated route.

Similarly, the program generation unit 25 creates a route program with which the end effector 3 follows the path for retracting once from the workpiece W and returns again to the path detected by the visual sensor 8 after moving away from the singular point, limit value of each axis, or set prohibited zone by a prescribed distance.

Furthermore, during deburring, a pressing force is generated by the robot device 1, so that the arm of the robot device 1 is deflected. Thus, in the present embodiment, it is desirable to determine the singular point and limit at the position where the amount of deflection is compensated.

Figure 9:
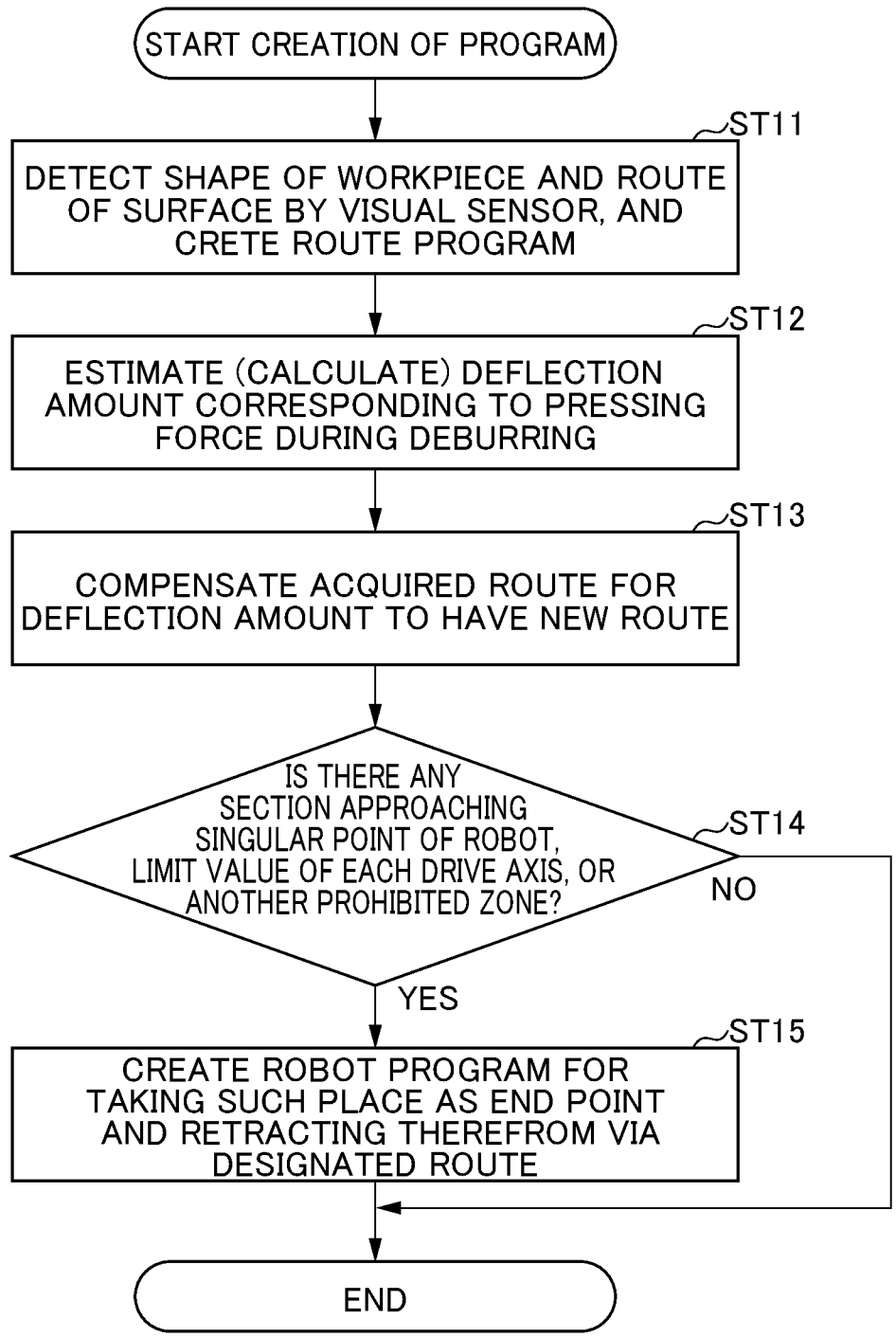
FIG. 9 is a flowchart for describing a control procedure of the program generation device illustrating the present embodiment.

FIG. 9 is a flowchart for describing a control procedure of the program generation device illustrating the present embodiment. Note that ST11 to ST15 indicate each of steps, and each of the steps is implemented when a CPU, not shown, loads and executes a control program stored in a ROM or the like on a RAM. This example corresponds to program generation processing in deburring.

First, the visual sensor 8 captures an image on the workpiece W to sense a route following the ridge of the workpiece W, and outputs it to the program generation unit 25. The program generation unit 25 analyzes the route data of the workpiece W output from the visual sensor 8 to create the route program, and temporarily holds it in the storage unit 22 (ST11).

Then, the calculation unit 23 refers to a spring constant table for the deburring tool 5 stored in the storage unit 22 based on the identification information of the robot device 1 as well as the size, material, and the like of the workpiece W, and calculates the amount of deflection caused when the deburring tool 5 is pressed against the workpiece W by calculation processing using the read spring constant k corresponding to the deburring tool 5 and the pressing force of the deburring tool 5 detected by the force sensor 4 (ST12).

Based on the calculated amount of deflection, the program generation unit 25 creates a new deburring route program that is acquired by compensating the route data of the route program for the deburring tool stored in the storage unit 22 in advance (ST13).

Then, the program generation unit 25 analyzes the newly created deburring route program to determine whether there is any section approaching the singular point of the robot device 1, limit value of each drive axis, or another prohibited zone (ST14).

When the program generation unit 25 determines herein that there is a section approaching the singular point of the robot device 1, limit value of each drive axis, or another prohibited zone, the processing is advanced to ST15. Then, the program generation unit 25 creates a route program that takes the place specified in Step ST14 as the end point and retracts therefrom via a designated route (ST15), and ends the processing. Note that the created final route program is stored in the storage unit 22.

In the meantime, when the program generation unit 25 determines in Step ST14 that there is no section approaching the singular point of the robot device 1, limit value of each drive axis, or another prohibited zone, the processing is ended.

Figure 10:
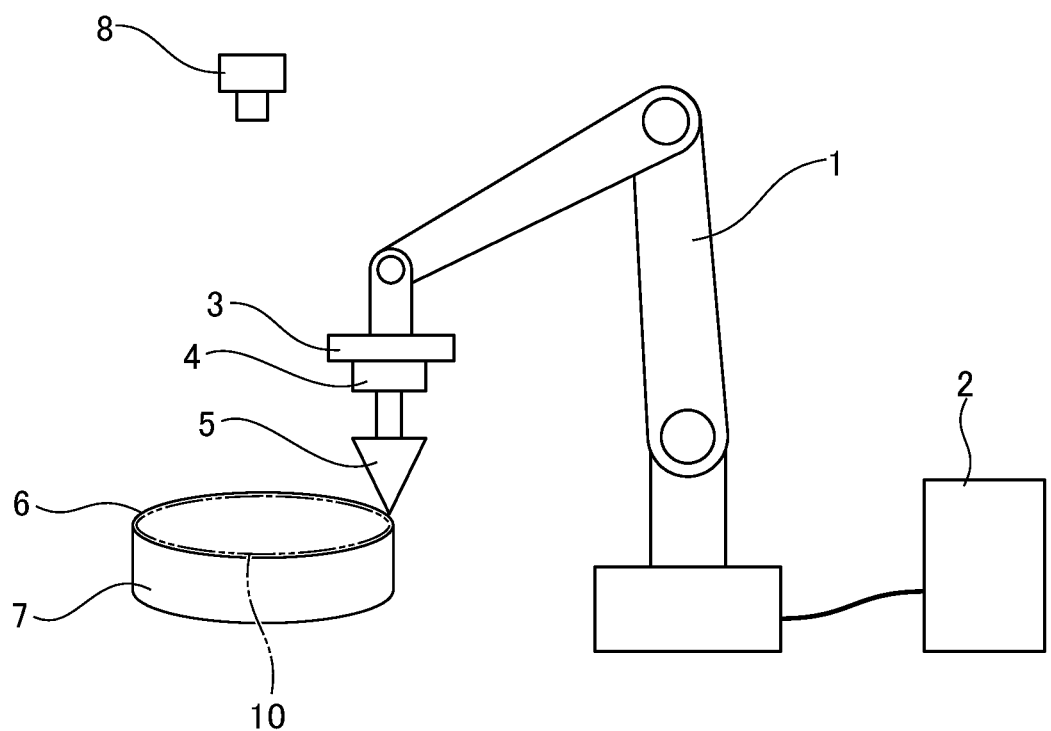
FIG. 10 is a schematic view for describing a deburring step performed by a robot illustrating the present embodiment.

FIG. 10 is a schematic view for describing the deburring step performed by the robot device 1 illustrating the present embodiment. This example illustrates the deburring step performed on the circumference part of the workpiece W according to the circular path in a state where the robot device 1 has the deburring tool 5 attached thereto. A virtual path 10 is a path on the inner side of the workpiece W, which is a virtually illustrated path of the deflection caused by the pressing force. The program generation unit 25 generates the route program to be a deburring route in which the deflection indicated by the virtual path 10 (illustrated by a broken line) is compensated.

Effect of Second Embodiment

According to the present embodiment, it is possible with the deburring route program to proceed deburring with high accuracy based on the ridge route taking the amount of deflection of the arm of the robot device 1 into consideration.

Third Embodiment

While the embodiment above is described regarding the program generation processing based on compensation of deflection in the deburring step, a similar deflection phenomenon occurs even in a case where the robot device 1 performs a polishing step when the tool of the robot device 1 abuts against the workpiece W. Described is a case of a straight route along which the polishing tool moves in a straight from on the surface of the workpiece W in the polishing step.

Thus, instead of deburring according to the second embodiment, the press amount of the robot device 1 in a specific position/pose in the polishing step may be measured to generate a route program for the polishing step compensated with the amount of deflection.

In the present embodiment, when automatically creating a route program for polishing by detecting the shape and the surface of the polishing-target workpiece by the polishing tool that is captured and detected by the visual sensor 8, the program generation unit 25 creates the route program that takes the coordinate value as the end point when the end effector 3 approaches the singular point, limit value of each axis, or another set prohibited zone, and retracts the end effector 3 via a designated route thereafter. That is, the program generation unit 25 creates the route program that takes the coordinate value when the route acquired by compensating the route the end effector 3 follows with the calculated amount of misalignment approaches the singular point the end effector 3 of the robot device 1 passes, limit value of each axis, or another set prohibited zone as the end point, and retracts the polishing tool from the end point via the designated route.

Similarly, the program generation unit 25 creates a route program with which the end effector 3 follows the path for retracting once from the workpiece W and returns again to the path sensed by the visual sensor 8 after the end effector 3 moves away from the singular point, limit value of each axis, or another set prohibited zone by a prescribed distance.

During polishing, a pressing force is generated by the robot device 1, so that the arm of the robot device 1 is deflected. Thus, in the present embodiment, it is desirable to determine the singular point and limit at the position where the amount of deflection is compensated.

Route Program Generation Processing for Polishing Step as Example

Figure 11:
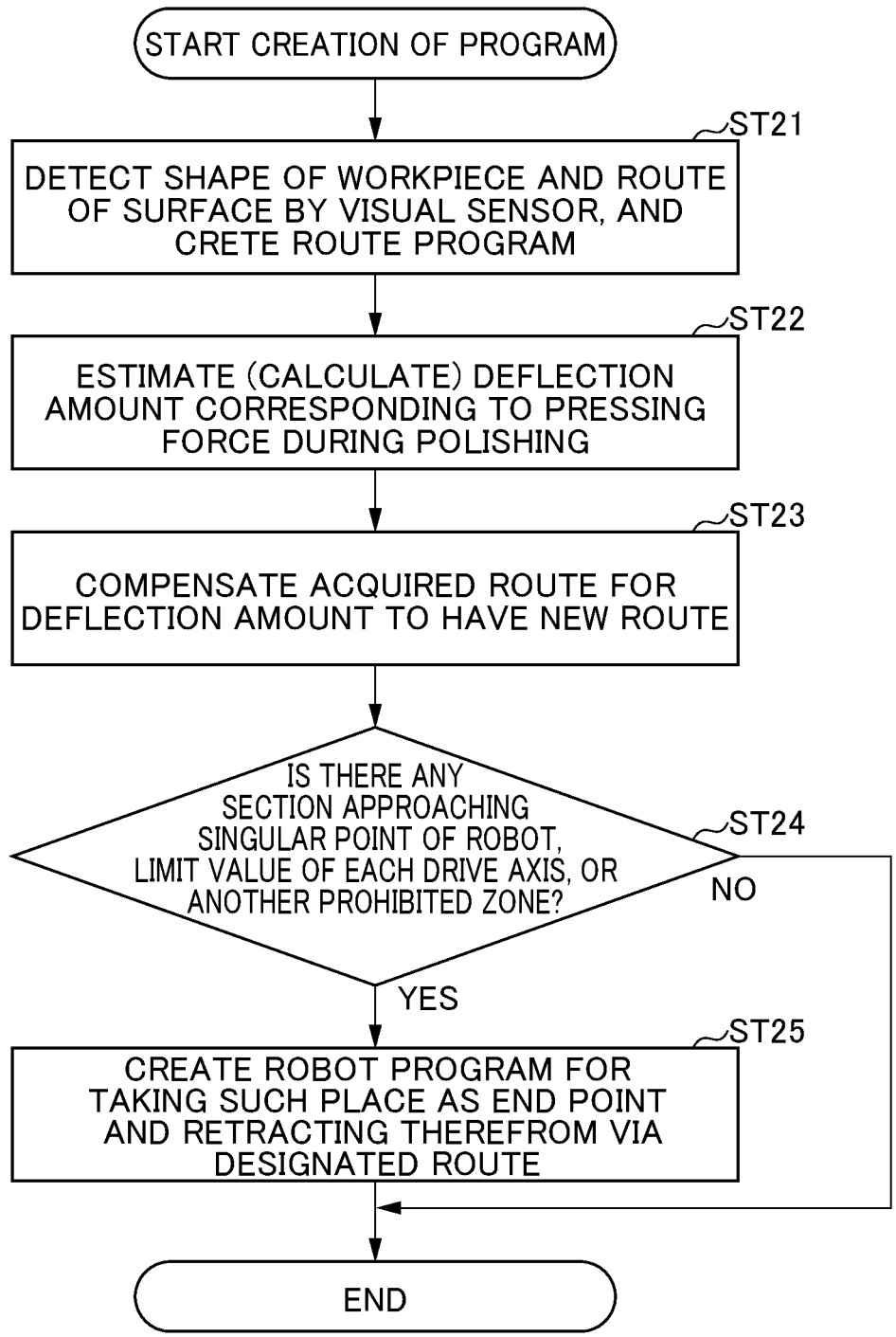
FIG. 11 is a flowchart for describing a control procedure of the program generation device illustrating the present embodiment.

FIG. 11 is a flowchart for describing a control procedure of the program generation device illustrating the present embodiment. Note that ST21 to ST25 indicate each of steps, and each of the steps is implemented when a CPU, not shown, loads and executes a control program stored in a ROM or the like on a RAM. This example corresponds to program generation processing in polishing.

First, the visual sensor 8 captures an image on the workpiece W, and outputs route data that follows a straight path along the shape and the surface of the workpiece W to the program generation unit 25. The program generation unit 25 analyzes the detected route data output from the visual sensor 8 to create the route program, and temporarily holds it in the storage unit 22 (ST21).

Then, the calculation unit 23 refers to a spring constant table for the polishing tool stored in the storage unit 22 based on the identification information of the robot device 1 as well as the size, material, and the like of the workpiece W, and calculates the amount of deflection caused when the polishing tool is pressed against the workpiece W by calculation processing using the read spring constant k corresponding to the polishing tool and the pressing force of the polishing tool detected by the force sensor 4 (ST22).

Based on the calculated amount of deflection, the program generation unit 25 creates a new polishing route program that is acquired by compensating the route data of the polishing route program stored in the storage unit 22 in advance (ST23).

Then, the program generation unit 25 analyzes the newly created polishing route program to determine whether there is any section approaching the singular point of the robot device 1, limit value of each drive axis, or another prohibited zone (ST24).

When the program generation unit 25 determines herein that there is a section approaching the singular point of the robot device 1, limit value of each drive axis, or another prohibited zone, the processing is advanced to ST25. Then, the program generation unit 25 creates a route program that takes the place specified in Step ST24 as an end point, and retracts therefrom via a designated route (ST25), and ends the processing. Note that the created final route program is stored in the storage unit 22.

In the meantime, when the program generation unit 25 determines in Step ST24 that there is no section approaching the singular point of the robot device 1, limit value of each drive axis, or another prohibited zone, the processing is ended.

Figure 12:
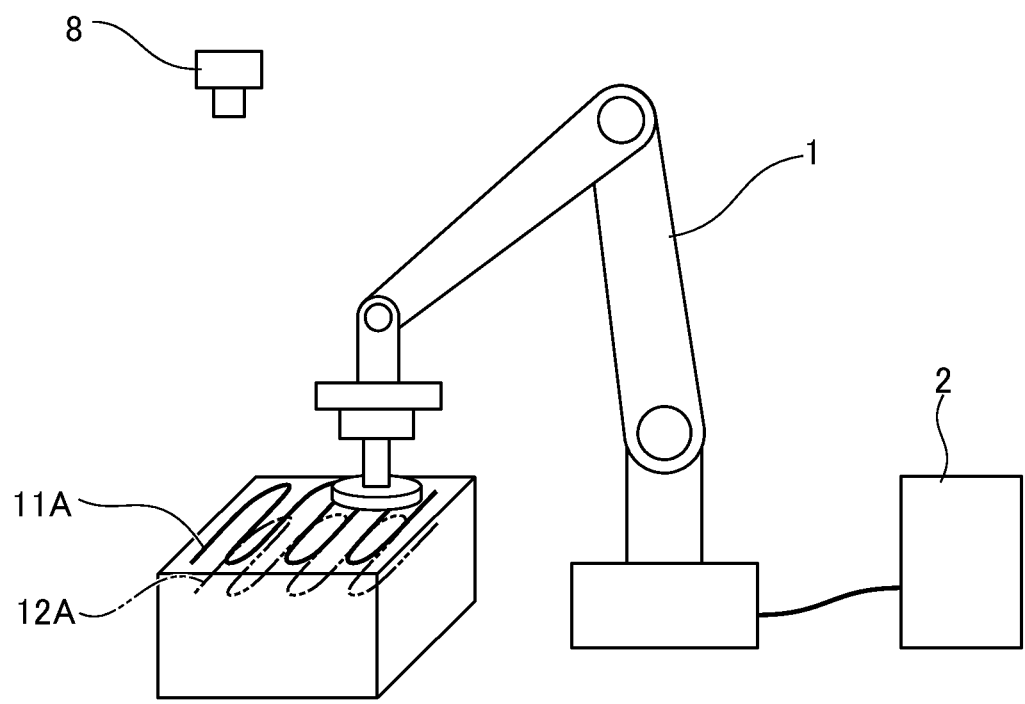
FIG. 12 is a schematic view for describing a polishing step performed by the robot illustrating the present embodiment.

FIG. 12 is a schematic view for describing the polishing step performed by the robot device 1 illustrating the present embodiment. This example illustrates a step in which the robot device 1 with the polishing tool attached thereto continuously polishes the top face of the workpiece W according to a polishing route 11A by combining the move in left and right directions on a straight route and the move in up and down directions on a straight route. A virtual route 12A is a path on the inner side of the workpiece W, which is a virtually illustrated route of the deflection caused by the pressing force. The program generation unit 25 generates the route program to be the polishing route 11A in which the deflection indicated by the virtual route 12A is compensated.

Effect of Third Embodiment

According to the present embodiment, it is possible with the polishing route program to proceed polishing with high accuracy based on the machining path taking the amount of deflection of the robot device 1 into consideration. While the case of generating the route program by the controller 2 is described in each of the embodiments above, it may also be implemented by a program managed by an OS installed in a data processing device such as the so-called personal computer that is connected to the controller 2 via a prescribed interface.

Furthermore, while the embodiments above are described by referring to the cases of creating the route programs for the deburring step or the polishing step as examples, the embodiments can also be applied to other steps as long as it is a step of pressing some kind of tools against a workpiece.

Moreover, while the case of calculating the amount of deflection by a calculation formula after actually measuring the press amount is described in the embodiments above, it is also possible to create and validate the route program on a simulator (PC) that stores the route data, the amount of deflection, and the like indicated in the embodiments and simulates the deflection state. Furthermore, the present disclosure is not limited by the embodiments above and changes (program, storage medium) and modifications within the scope capable of achieving the object of the present disclosure are included therein.

EXPLANATION OF REFERENCE NUMERALS

1 Robot
2 Controller (control unit)
3 Robot wrist (end effector)
4 Force sensor (detection unit)
5 Deburring tool
7 Workpiece (target)
8 Visual sensor (sensing unit)
21 Force control unit
22 Storage unit
23 Calculation unit
24 Communication unit (acquisition unit)
25 Program generation unit (generation unit)

The invention claimed is:

1. A program generation device comprising:
an acquisition unit that acquires route data indicating a route to be followed by a tip of a robot with respect to a target;
a detection unit that detects a pressing force for pressing the tip of the robot against the target;
a calculation unit that calculates an amount of misalignment of the route to be followed due to deflection of the tip of the robot, based on the pressing force detected by the detection unit and a prescribed constant;
a generation unit that automatically generates a route program for controlling a moving route of the tip of the robot based on the route data acquired by the acquisition unit and the amount of misalignment calculated by the calculation unit; and
a sensing unit that senses the route to be followed by the tip of the robot with respect to the target and outputs the route data, wherein
the generation unit generates a route program that:
takes, as an end point, a coordinate value when a route that is acquired by compensating the route to be followed by the tip of the robot with the amount of misalignment approaches a singular point of the robot, a limit value of each drive axis, or a set prohibited zone;
retracts the tip of the robot from the end point according to a designated route,
automatically generates the route program for controlling the moving route of the tip of the robot based on the route data output from the sensing unit and the amount of misalignment calculated by the calculation unit, and
generates a route program that returns the tip of the robot to the route to be followed that is sensed by the sensing unit, after retracting the tip of the robot from the end point by a prescribed distance.

2. The program generation device according to claim 1, comprising a storage unit that stores the prescribed constant acquired from a measured amount of deflection caused when the tip of the robot presses the target and the pressing force detected by the detection unit.

3. The program generation device according to claim 1, wherein a prescribed tool to be attached to the tip of the robot is a deburring tool.

4. The program generation device according to claim 1, wherein a prescribed tool to be attached to the tip of the robot is a polishing tool.

5. A program generation method comprising:
an acquisition step of acquiring route data indicating a route to be followed by a tip of a robot with respect to a target;
a detection step of detecting a pressing force for pressing the tip of the robot against the target;
a storing step of storing a prescribed constant acquired from a measured amount of deflection caused when the tip of the robot presses the target and the pressing force detected by the detection step;
a calculation step of calculating an amount of misalignment of the route to be followed caused due to deflection of the tip of the robot, based on the pressing force detected by the detection step and the prescribed constant;
a generation step of automatically generating a route program for controlling a moving route of the tip of the robot based on the route data acquired by the acquisition step and the amount of misalignment calculated by the calculation step; and
a sensing step of sensing the route to be followed by the tip of the robot with respect to the target and outputting the route data, wherein
the generation step further includes generating a route program that:
takes, as an end point, a coordinate value when a route that is acquired by compensating the route to be followed by the tip of the robot with the amount of misalignment approaches a singular point of the robot, a limit value of each drive axis, or a set prohibited zone;
retracts the tip of the robot from the end point according to a designated route,
automatically generates the route program for controlling the moving route of the tip of the robot based on the route data output from the sensing step and the amount of misalignment calculated by the calculation step, and generates a route program that returns the tip of the robot to the route to be followed that is sensed by the sensing step, after retracting the tip of the robot from the end point by a prescribed distance.

* * * * *